United States Patent [19]
Palmer

[11] 3,945,474
[45] Mar. 23, 1976

[54] SHOCK ABSORBER
[75] Inventor: Dale A. Palmer, Monroe, Mich.
[73] Assignee: Monroe Auto Equipment Company, Monroe, Mich.
[22] Filed: Jan. 20, 1975
[21] Appl. No.: 542,617

[52] U.S. Cl. ............ 188/322; 137/516.17; 137/525; 188/282
[51] Int. Cl.² .......................................... F16F 9/348
[58] Field of Search .......... 188/280, 282, 317, 322; 137/525, 516.15, 516.17, 529, 525.3

[56] References Cited
UNITED STATES PATENTS

| | | | |
|---|---|---|---|
| 1,967,418 | 7/1934 | McPhail | 137/525 X |
| 2,717,058 | 9/1955 | Brundrett | 188/322 X |
| 2,732,039 | 1/1956 | Funkhouser et al. | 188/282 |

FOREIGN PATENTS OR APPLICATIONS

| | | | |
|---|---|---|---|
| 699,896 | 11/1953 | United Kingdom | 188/282 |
| 1,210,013 | 10/1970 | United Kingdom | 137/525 |

Primary Examiner—George E. A. Halvosa
Attorney, Agent, or Firm—Harness, Dickey & Pierce

[57] ABSTRACT

A shock absorber of the direct acting hydraulic type is disclosed as comprising a reciprocable piston having a piston body, the piston body being formed with first and second sets of spaced flow ports, the sets of flow ports being concentrically oriented with the first set being spaced radially inwardly from the second set; a first valve seat on one end of the piston body adjacent the first set of flow ports; a first valve member engageable with the first valve seat to block fluid flow through the first set of flow ports; second and third valve seats on the opposite end of the piston body and located radially inwardly and outwardly from the second set of flow ports; a second valve member in the form of a flat annular valve disc disposed adjacent the second and third valve seats and engageable therewith to block fluid flow through the second set of flow ports; an annular compression plate disposed on the axially opposite side of the valve disc from the piston body; the compression plate having axial movement relative to the piston body between a first position maintaining the second valve member adjacent the second and third valve seats but permitting a first magnitude of fluid flow through the second set of flow ports, and a second position wherein the second valve member is displaced predeterminately from the piston body to permit a second magnitude of fluid flow through the second set of flow ports, and at least one spring disc yieldably resisting axial movement of the plate and the valve disc.

4 Claims, 3 Drawing Figures

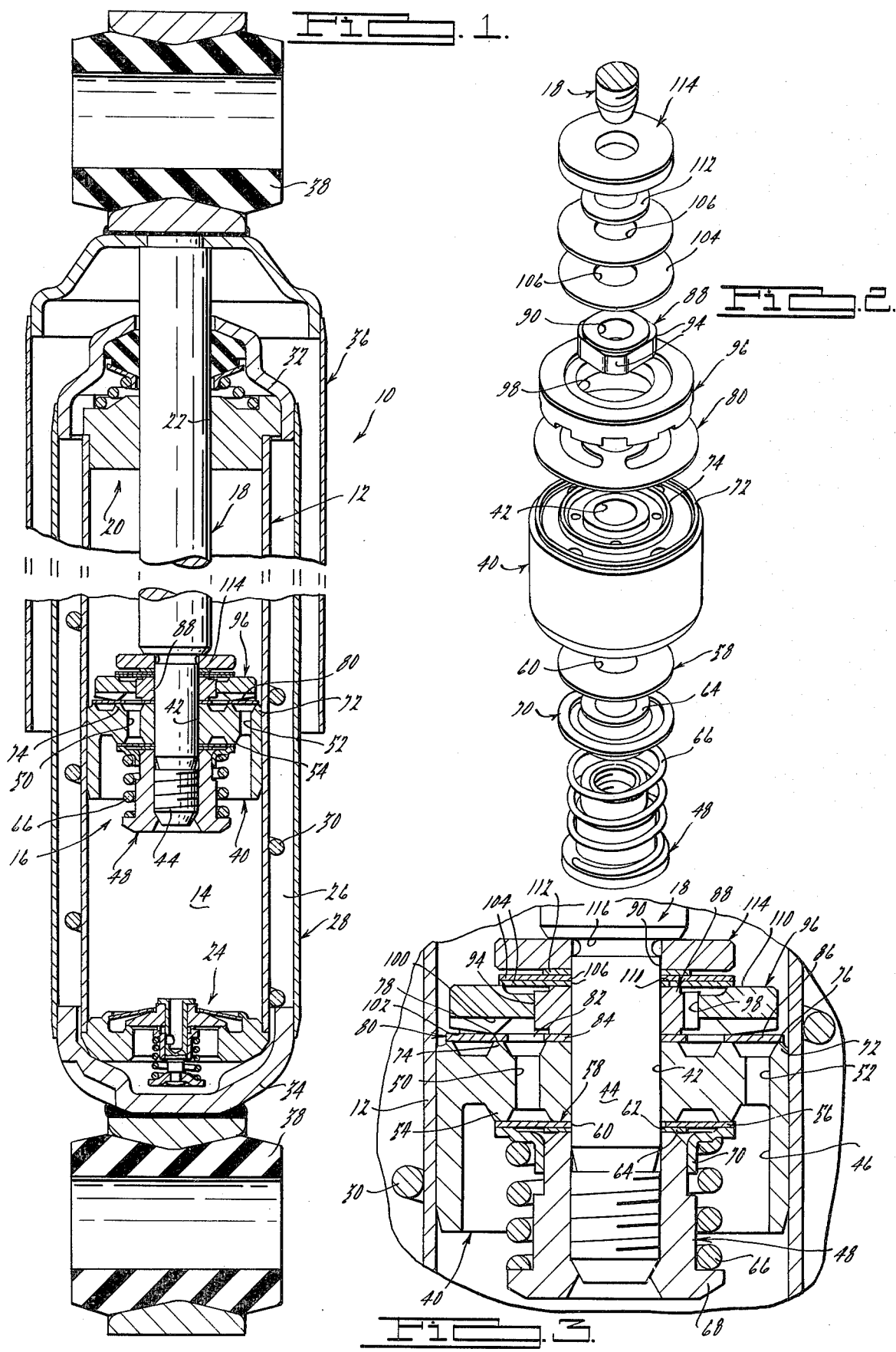

SHOCK ABSORBER

SUMMARY OF THE INVENTION

This invention relates generally to vehicular shock absorbers and, more particularly, to a new and improved piston construction for direct acting telescopic shock absorbers.

It is accordingly a general object of the present invention to provide a new and improved shock absorber construction.

It is a more particular object of the present invention to provide a new and improved shock absorber construction which embodies a novel piston design therein.

It is yet a more particular object of the present invention to provide a new and improved shock absorber piston construction which utilizes multiple springs for controlling fluid flow through the piston flow ports under various operating conditions.

It is another object of the present invention to provide a new and improved shock absorber piston construction of the above-described type wherein a first magnitude of fluid flow through the piston is controlled by the spring force embodied in the piston valve member and a second magnitude of fluid force is controlled by a second spring acting upon a compression plate located adjacent the piston valve member.

It is another object of the present invention to provide a new and improved shock absorber piston construction of the above-described type which may utilize different spring forces in the valving design so as to provide for universality of application.

It is a further object of the present invention to provide a new and improved shock absorber piston construction which is of a relatively simple design, is economical to manufacture, and will have a long and effective operational life.

Other objects and advantages of the present invention will become apparent from the following detailed description taken in conjunction with the accompanying drawing.

BRIEF DESCRIPTION OF THE DRAWING

FIG. 1 is a longitudinal cross-sectional view of a vehicle shock absorber incorporating the new and improved piston construction of the present invention;

FIG. 2 is an elevated perspective exploded view of the piston construction embodying the principles of the present invention, and FIG. 3 is an enlarged cross-sectional view of the piston construction shown in FIGS. 1 and 2.

DETAILED DESCRIPTION OF A PREFERRED EMBODIMENT

Referring now in detail to the drawing and in particular to FIG. 1 thereof, a tubular direct acting hydraulic shock absorber 10 is shown as comprising an elongated tubular pressure cylinder 12 defining a hydraulic fluid containing working chamber 14. Disposed within the chamber 14 is a reciprocable piston 16 that is secured to one end of an axially extending piston rod 18. The piston rod is supported and guided for movement within the pressure cylinder 12 by means of a combination fluid seal and rod guide assembly 20 located in the upper end of the cylinder 12 and having a central axially extending bore 22 through which the piston rod 18 extends. A base valve, generally designated by the numeral 24, is located within the lower end of the pressure cylinder 12 and functions to control hydraulic fluid communication between the working chamber 14 and a fluid reservoir 26 that is defined between the outer periphery of the cylinder 12 and the inner periphery of a tubular reserve tube 28 which is arranged concentrically around the exterior of the pressure cylinder 12. The construction and operation of the base valve may be of the type shown and described in U.S. Pat. No. 3,771,626, which patent is incorporated by reference herein. As is conventional in the art, a helical baffle 30 is provided within the fluid reservoir 26 for controlling aeration of the hydraulic fluid transferred between the reservoir 26 and the working chamber 14. The upper and lower ends of the shock absorber 10 are provided with generally cup-shaped upper and lower end caps 32 and 34, respectively, which are secured, as by welding, to the opposite ends of the reserve tube 28, as illustrated. The shock absorber 10 is shown as being provided with a dirt shield 36 which is secured at its upper end to the upper end of the piston rod 18, and suitable end fittings 38 are secured to the upper end of the piston rod 18 and the lower end cap 34 for operatively securing the shock absorber 10 between the sprung and unsprung portions of an automotive vehicle. As will be appreciated by those skilled in the art, upon reciprocal movement of the piston rod 18 and piston 16 carried thereon, hydraulic fluid within the chamber 14 will be transferred between the upper and lower ends of the cylinder 12 and between the chamber 14 and the fluid reservoir 26, whereby to dampen relative movement between the sprung portion of the associated vehicle and the unsprung portion thereof. Toward this end, the piston 16 is provided with a new and improved valving arrangement for selectively controlling the flow of hydraulic fluid between the upper and lower ends of the chamber 14 during reciprocal movement thereof, as will hereinafter be described in detail.

In accordance with the principles of the present invention, the shock absorber piston 16 comprises a generally cylindrically shaped piston body 40 that is formed with a central axially extending bore 42 within which a reduced diameter end portion 44 of the piston rod is received. The lower or underside of the piston body 40 is formed with an enlarged diameter recess or counterbore 46 within which a threaded nut or similar type fastening element 48 is threadably received upon the end portion 44 to retain the piston body 40 upon the piston rod 18. The piston body 40 is formed with first and second sets of axially extending circumferentially spaced flow ports 50 and 52, with each of the sets of flow ports 50 and 52 preferably comprising four circumferentially spaced ports and with the second set of ports 52 being spaced radially outwardly from and concentrically arranged relative to the first set of flow ports 50. Disposed within the counterbore 46 and extending axially downwardly therewithin is an annular lower valve seat 54 which is spaced radially outwardly from the inner set of flow ports 50 and radially inwardly from the outer set of flow ports 52. The valve seat 54 defines a generally radially extending seating surface 56 which is adapted to be selectively engaged by the upper side of a generally disc-shaped valve member 58. The valve member 58 is formed with a central opening 60 through which the lower end portion 44 of the piston rod 18 extends. The inner periphery of the valve disc 58 is adapted to be fixedly retained or secured to the piston body 40 by being clampingly secured between an annular shoulder 62 on the body 40 and a spacer washer 64, the latter of which bears directly against the upper end of the threaded nut 48. A helical coil spring 66 is arranged concentrically of the nut 48 and is supported at the lower end thereof by a radially outwardly extending flange 68 on the lower end of the nut 48. The upper end of the spring 66 bears against a spring retainer 70 which in turn acts against the underside of the valve disc 58, whereby to resiliently urge the valve disc 58 into sealing engagement with the seating surface 56 of the valve seat 54. As will be appreciated by those skilled in the art, at such time as the piston body 40 moves upwardly within the working chamber 14 of the pressure cylinder 12, fluid will flow downwardly through the inner set of flow ports 50, thereby forcing the outer periphery of the valve disc 58 downwardly against the resistance of the spring 66, whereby fluid may flow from the flow ports 50, between the seating surface 56 and the upper side of the valve disc 58 into the lower end of the working chamber 14.

As best seen in FIG. 3, the upper end of the piston body 40 is formed with a pair of concentrically oriented axially upwardly extending annular valve seats 72 and 74, the former of which extends around the outer periphery of the upper end of the piston body 40 at a position radially outwardly from the outer set of flow ports 52. The valve seat 74 is disposed generally axially above the aforedescribed valve seat 54 and extends axially upwardly from the piston body 40 at a position spaced radially inwardly from the flow ports 52. The valve seats 72, 74 define generally radially disposed seating surfaces 76 and 78, respectively, which are adapted to be selectively sealingly engaged by means of a generally flat valve disc 80 that is disposed directly above the piston body 40, as seen in FIG. 3. The valve disc 80 is preferably fabricated of a suitable spring steel material and, as seen in FIG. 2, is formed with a generally C-shaped or circumferentially extending slot or flow passage 82 which extends almost entirely, but not completely, around the valve disc 80 and separates the disc 80 into radially inner and outer peripheral portions 84 and 86, respectively. The radially inner portion 84 of the valve disc 80 is formed with a suitable opening through which the piston rod end portion 44 extends for retaining the valve disc 80 in its operative position relative to the piston body 40. The radially outer portion 86 is adapted to bear upon or engage the valve seating surfaces 76, 78 and thereby block fluid flow from the ports 52 into the upper end of the chamber 14, as will later be described.

Disposed directly above the valve disc 80 is a valve guide member 88 which is formed with a central bore 90 through which the piston rod end portion 44 extends. As seen in FIG. 2, the valve guide 88 is generally square in transverse cross section and has the various corners thereof partially rounded off so as to define four circumferentially spaced contact points, generally designated by the numeral 94. Disposed radially outwardly from the guide member 88 and extending therearound in the general radial plane thereof is a compression plate, generally designated by the numeral 96, which is formed with a central opening 98. The diameter of the opening 98 is approximately equal to and slightly larger than the diagonal dimension of the valve guide member 88, whereby the compression plate 96 is axially slidable or movable relative to the guide member 88 and is guided for such movement by the contact points 94. The underside of the compression plate 96 is formed with a plurality of circumferentially spaced, radially inwardly extending and axially upwardly projecting notches or recesses 100, which are preferably although not necessarily eight in number, and which permit fluid flow communication between the flow passage 82 and the upper end of the working chamber 14. The underside of the compression plate 96 is relieved radially upwardly and outwardly at an angle of approximately 2°, as indicated in a somewhat exaggerated fashion at 102 in FIG. 3. It will be seen best in FIG. 3 that the lowermost portion of the plate 96 bears against the upper side of the valve disc 80 at a position directly axially above the valve seat 74, whereby the radially innermost part of the disc portion 86 is releasably retained in engagement with the surface 78; however, because of the upwardly and outwardly inclined surface 102, the underside of the plate 96 is spaced axially away from the upper side of the disc 80 at a position above the valve seat 72, thereby permitting the radially outer part of the disc portion 86 to deflect slightly upwardly away from the surface 76 under certain operating conditions of the shock absorber 10, as will hereinafter be described in connection with the overall operation of the piston 16.

Disposed directly above the valve guide member 88 and compression plate 96 is a pair of spring discs, generally designated by the numeral 104, which are formed with central coaxial bores 106 through which the end portion 44 of the piston rod 18 extends. The lower of the spring discs 104 bears directly against the upper side or surface 110 of the compression plate 96 and also against the upper surface 111 of the guide member 88. A suitable annular spacer member 112 is disposed directly above the spring discs 104 and an annular washer 114 is retained between the upper side of the spacer 110 and radial shoulder 116 formed at the juncture of the main portion of the piston rod 18 and a lower end portion 44 thereof. As will be apparent, the washer 114, spacer 112, spring discs 104, and guide member 88, as well as the piston body 40, are all retained upon the piston rod 18 by means of the threaded nut 48.

The spring discs 104 are adapted to yieldably resist upward movement of the compression plate 96 relative to the guide member 88, yet permits such upward movement of the compression plate 96 under certain operating conditions of the piston 16. The particular amount of resistance provided by the discs 104 can, therefore, be controlled by the number thereof and/or construction and material thereof. Although two of such discs 104 are shown and described in this application, the scope or fair meaning of the claims appended hereto are in no way intended to be limited to such a construction since one, two or more of such discs 104 could be used, depending upon the particular application and performance characteristics desired. Additionally, it will be noted that the axial thickness of the spacer 112 may be varied to control the amount of upward movement of the spring discs 104 and hence the amount of axial upward movement of the compression plate 96.

In operation of the shock absorber 10, the outer periphery of the valve disc 80 is normally engaged or seats upon the surfaces 76, 78 to block fluid flow through the flow ports 52. During low speed downward movement of the piston 16 within the working chamber 14, hydraulic fluid will pass upwardly through the flow ports 52 and deflect the outer periphery of the valve disc 80 upwardly to a position where it engages the inclined lower surface 102 of the compression plate 96, whereupon a predetermined magnitude of such fluid will thereafter pass into the upper end of the working chamber 14. At such time as the downward speed of the piston 16 exceeds a predetermined level, the hydraulic fluid flowing upwardly through the set of ports 52 will act to bias the outer peripheral portion 86 of the valve disc 80 upwardly and also cause the compression plate 96 to move upwardly against the resistance of the spring discs 104, whereupon a greater magnitude of fluid flow will occur between the underside of the valve disc 80 and the seating surfaces 76, 78, with the amount of resistance to such additional fluid flow depending upon the number and construction of spring discs 104. Thus, it will be seen that under low speed movement of the piston 16, a limited amount of fluid flow will occur between the outer seating surface 76 and the underside of the valve disc 80 since the outer periphery of the valve disc 80 will only move upwardly as far as the inclined or relieved surface 102 permits; however, at a greater rate of movement of the piston 16, the compression plate 96 itself will move upwardly, thereby permitting the outer peripheral portion 86 of the valve disc 80 to move entirely off from both the seating surfaces 76, 78 to permit the aforementioned greater magnitude of fluid flow. As previously mentioned, of course, at such time as the piston 16 moves upwardly within the pressure cylinder 12, i.e. during a rebound stroke or cycle, fluid will flow through the notches 100 and thereafter through the circumferentially extending flow passage 82 through the inner set of flow ports 50, whereupon the valve disc 58 will be displaced against the resistance of the coil spring 66 to permit fluid to flow from the upper end of the working chamber 14 to the lower end thereof.

It will be seen from the foregoing that the present invention provides a new and improved shock absorber piston construction wherein the magnitude of fluid flow, and hence the degree of shock absorber damping, is achieved through the use of multiple spring elements in the piston valving. By virtue of the fact that the construction and number of spring discs 104 may be easily varied, selective application of the shock absorber may be made without excessive costs for tooling, inventory, assembly, etc. Additionally, the subject piston design lends itself to the use of powdered or sintered metal techniques, since the guide member 88, compression plate 96, etc., may be so constructed, thereby significantly reducing the cost of the actual piston construction.

While it will be apparent that the preferred embodiment illustrated herein is well calculated to fulfill the objects above stated, it will be appreciated that the present invention is susceptible to modification, variation and change without departing from the scope of the invention.

I claim:

1. A shock absorber piston construction comprising,
   a piston body having means thereon connected to one end of an associated piston rod,
   said piston body being formed with first and second sets of axially extending, circumferentially spaced flow ports,
   said sets of flow ports being concentrically oriented, with said first set being spaced radially inwardly from said second set,
   a first annular axially extending valve seat on one end of said body adjacent said first set of flow ports,
   a first valve member engageable with said first valve seat to block fluid flow through said first set of flow ports,
   second and third annular axially extending valve seats on the opposite end of said piston body and located radially inwardly and outwardly from said second set of flow ports,
   a second valve member in the form of a flat annular valve disc extending radially of said body directly adjacent said second and third valve seats and engageable therewith to block fluid flow through said second set of flow ports,
   said second valve member having a first fluid flow passage formed therein communicating with said first set of flow ports,
   an annular compression plate disposed on the axially opposite side of said valve disc from said piston body, the side of said compression plate confronting said valve disc having a plurality of circumferentially spaced, radially extending recesses formed therein providing a second flow passage that is serially communicable with said first flow passage,
   said side of said compression plate being tapered radially outwardly and axially away from said valve disc, whereby to permit the outer peripheral portion of said valve disc to flex away from one of said second and third valve seats and thereby allow said first magnitude of fluid flow through said second set of flow ports,
   said plate having a central annular opening through which said one end of said piston rod extends,
   a valve guide member located coaxially of said piston body and at least partially within said annular opening of said compression plate,
   said guide member having a non-circular outer peripheral edge which defines with the inner periphery of said annular opening a plurality of circumferentially spaced guide points for guiding said compression plate for axial movement relative to said piston body between a first position maintaining said valve disc adjacent and engaged with said second and third valve seats but permitting said first magnitude of fluid flow through said second set of flow ports, and a second position wherein said second valve member is axially displaced predeterminately from said piston body to permit a greater magnitude of fluid flow through said second set of flow ports and between said valve disc and said piston body, and
   at least one spring disc disposed on the axially opposite side of said compression plate from said valve disc yieldably resisting axial movement of said plate and said valve disc away from said piston body,
   said spring disc extending radially of said piston rod and having an outer peripheral portion thereof bearing upon the adjacent side of said compression plate and an inner peripheral portion clampingly engaged with the adjacent side of said guide member.

2. The invention as set forth in claim 1 which includes annular spacer means disposed adjacent said spring disc for limiting axial displacement of said compression plate.

3. The invention as set forth in claim 1 wherein said piston body is formed with a central axially extending opening adapted to receive at least a portion of one end of said piston rod.

4. The invention as set forth in claim 3 which includes a coil spring disposed in part within a recessed area of said piston body and adapted to resiliently urge said first valve member toward a position engaging said first valve seat.

* * * * *